Sept. 18, 1951 L. F. MOHNS 2,568,162
THREADED LOCKING DEVICE
Filed Jan. 11, 1949
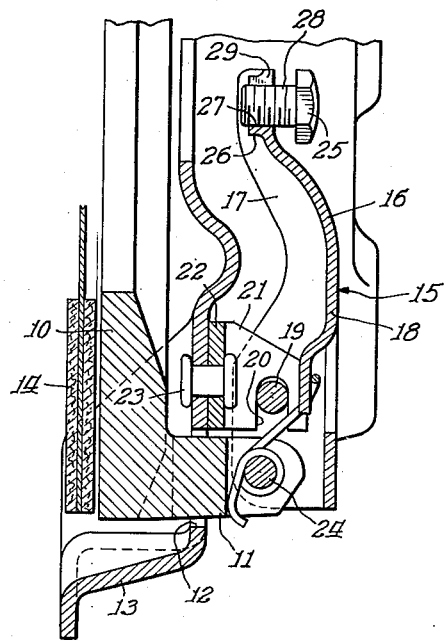
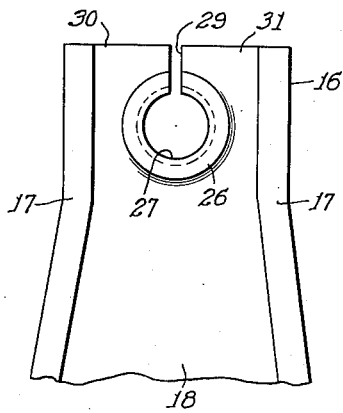
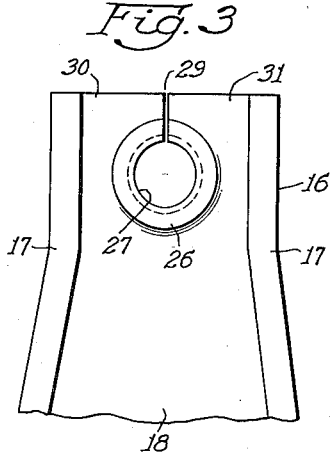
Inventor:
Leslie F. Mohns Patented Sept. 18, 1951

2,568,162

UNITED STATES PATENT OFFICE 2,568,162

THREADED LOCKING DEVICE

Leslie F. Mohns, Rockford, Ill., assignor to Borg-Warner Corporation, Chicago, Ill., a corporation of Illinois Application January 11, 1949, Serial No. 70,208

4 Claims. (Cl. 151—21)

This invention relates to a threaded locking device.

In the conventional practice of locking threaded members, such as a lever having a threaded opening receiving a screw, it is customary to thread the screw into the member or lever and thereafter to slot the threaded end of the screw and spread the spaced portions of the slotted end of the screw by a staking operation to distort the engaged threads of the screw and lever to prevent unwanted relative rotation of the lever and screw. An alternative practice is to utilize a lock nut threaded on the screw to anchor the screw against rotation relative to the lever.

It is the primary object of the present invention to provide a new threaded locking device wherein the locking device, in assembly with a screw, may be adjustably rotated relative to each other by willful effort but are normally locked against unwanted accidental relative rotation, without the necessity of employment of a separate lock nut or destructive distortion of the threads of the device or screw.

Another object of the invention is to provide a threaded locking device which may be formed as a portion of a lever or similar structure, one end of the lever being provided with a threaded opening and with a slot extending through the lever end and communicating with the opening, the sides of the slotted lever end engaged with clamping pressure so as to cause the opening and threads to assume an oval shape, and the lever, including the threads thereof, is then surface-hardened to impart a spring action to the spaced portions of the lever end, defining the slot, to effect a locking engagement with a screw when engaged with the threaded end of the lever. A threaded locking device made in this manner is capable of firmly but yieldingly gripping the threads of the screw by sufficient compressive effort to insure the maintenance of a tight locking engagement between the threads of the device or lever and screw which will permit the willful relative rotation of the device or lever and screw but will positively prevent accidental or unwanted relative rotation of the same.

Other objects and advantages will become apparent from the following description and claims, taken in connection with the drawing, wherein:

Fig. 1 is a sectional view of a portion of a clutch including a release lever and adjusting screw assembly embodying the present invention;

Figs. 2 and 3 are front elevations of the upper end of the lever illustrating the threaded end of the lever in various stages in the treatment of the same to provide a locking device formed in accordance with this invention.

The drawing is to be understood as being more or less of a schematic character for the purpose of disclosing a typical or preferred embodiment of the invention.

The present invention is particularly, but not solely, adapted to a clutch lever adjusting assembly, such as illustrated in Fig. 1 of the drawing. The assembly may be used with a clutch comprising an annular metal pressure plate 10 having lugs 11 integral therewith and extending laterally thereof into spaced openings 12 of an annular cover plate or stamping 13 to provide a driving connection between a flywheel (not shown) secured to the outer peripheral edge of the plate 13, and the pressure plate 10, while permitting axial movement of the pressure plate into and out of engagement with a driven clutch disc 14 secured to a driven shaft (not shown). The pressure plate is normally urged into engagement with the driven disc 14 having metallic impregnated fibrous friction facings through the the medium of a plurality of springs (not shown) compressed between the pressure plate and the cover plate, and each spring having its opposite ends engaging these plates. The clutch structure is well known to persons skilled in the clutch art and, for this reason, has been only briefly described.

To disengage the pressure plate and driven disc, a plurality of lever assemblies, one of which is indicated at 15, are provided. Each assembly comprises a lever 16 extending radially of the axis of the rotation of the clutch, and the lever is a sheet metal stamping of elongated form, generally channel-shaped in cross-section, to provide longitudinal ribs 17 and a curved central or body portion 18 intermediate the ribs and connecting the same. The lever 16 is pivotally connected to the cover plate 13 by a pin 19 extending through aligned openings in the ribs 17, 17 of the lever and through slots 20 in the spaced walls 21 of a bracket 22 disposed between the ribs of the lever and riveted as at 23 to the cover plate 13. The lever is also pivotally connected to the lug 11 of the pressure plate 10 by pin 24 extending through the ribs 17, 17 of the lever at their radially outer extremities and through the lug 11 disposed between the ribs 17, 17 of the lever. It will be clearly apparent from the foregoing description that pressure applied to the radially inner ends of the lever to urge the same toward the cover plate will cause the lever to fulcrum on the bracket 22 to thereby move the pressure plate to disengage the same from the driven disc 14 releasing the driving connection between the pressure plate and the driven disc.

In the operation of a clutch of the type described, the pressure plate is repeatedly engaged and disengaged with the friction facings of the driven disc and the ensuing friction causes wear of the engageable surfaces of these members of the clutch, with consequent reduction of the thickness of the same by frictional wearing action. As this reduction of thickness of the pressure plate and the friction facings of the driven disc occur, there is a change in the relations and positions of the elements of the control linkage connected to the release levers, such as the lever 16, and which control linkage is actuated by the operator of the machine, such as an automobile. With many clutches, as, for example, automobile clutches, it is desirable that the initial, manually actuated elements of the control linkage should travel in certain prescribed paths and that the position and length of these paths should be permanently fixed. This is interfered with by wear and consequent reduction in the thickness of the pressure plate and friction facings of the driven disc.

To compensate for this condition, the clutch release lever assemblies are provided with devices to adjust the position of the elements of the clutch-operating linkage so that the linkage will operate to control the release lever assemblies to effect the positive and quick disengagement of the friction surfaces of the pressure plate and friction facings of the driven disc, when desired.

Referring to Fig. 1, one of these adjusting devices is provided in the clutch there shown and comprises a hardened screw 25 having threaded engagement with an extruded hollow boss 26 in the central or body portion 18 of the lever 16. As the screw 25 is engageable with the control linkage actuated by the operator of the automobile, movement of the screw relative to the linkage and lever can correctly adjust the positions of the elements of the linkage due to wear of the pressure plate and friction facings of the driven disc and thereby insure the proper operation of the release lever assembly 15 to effect the positive and quick disengagement of the pressure plate and the friction facings of the driven disc in the event of wear thereof and reduction of thickness of these elements of the clutch.

To prevent unwanted or accidental rotation of the screw 25 and consequent disruption of the correct adjustment of the manually operated control linkage connection with the lever assembly, it has heretofore been proposed to lock the screw in the lever by slotting the threaded end of the screw and then spreading the spaced portions of the slotted threaded end of the screw to distort the engaged threads of the screw and lever or, alternatively, to utilize a lock nut threaded on the screw. Disadvantages arise in each of these cases, however, inasmuch as where the first locking procedure is utilized, to obtain another adjustment, movement of the screw thereafter further into the lever destroys the locking effect of the distorted thread, and the split end of the screw must then be further spread to again distort the threads of the screw and lever to obtain locking of the screw, and in the second locking procedure, the lock nut must be released from locking engagement with the screw and lever, the screw then rotated, and the lock nut rotated to again lock the screw and lever against relative movement. As clutches usually employ three or more of these release lever assemblies located in somewhat inaccessible portions of the automobile, any readjustment of the screws by either of these latter locking procedures is a tedious and time-taking operation.

The lever is formed and treated in practicing the present invention to provide a locking device designed to lock the screw and lever in such manner as to permit rotation of the screw by manual willful effort for adjustment purposes but to prevent accidental or unwanted rotation of the screw at all other times, without the necessity of employing either a lock nut, or, alternatively, slotting the screw and spreading the slotted screw. The threaded locking device and method of making the same of the present invention contemplates that an element, such as the lever 16, be initially and preferably, but not necessarily, formed as a sheet metal stamping provided at its radially inner end with an extruded hollow boss 26 having a screw threaded circular bore with the thread 27 thereof adapted for engagement by the thread 28 of the screw 25. Thereafter, the central or body portion 18 of the lever is provided with a slot 29 extending inward from the end of the lever, through the threads in the boss, and communicating with the bore in the boss 26, as shown in Fig. 2. The slotted end of the lever is then positioned between the jaws of a vise or other suitable device for applying pressure to the ribs 17, 17 of the lever and sufficient pressure is then applied to cause the two spaced portions 30 and 31 of the slotted lever end to be moved toward each other to substantially reduce the width of the slot 29 and to cause the threaded bore and thereby thread 27 in the boss 26 to assume an oval shape, as shown in Fig. 3. As the screw threaded bore of the boss and screws, prior to the clamping operation, are substantially the same diameters to permit ready rotation of the screw relative to the lever, it will be apparent that the clamping operation will cause the oval-shaped thread of the lever to tightly engage the thread of the screw, when the screw is threaded into the lever. After the clamping operation on the lever and prior to the assembly of the lever and screw, the surface of the lever may be hardened to a depth from .015″ to .020″ by well known practices, such as positioning the lever in a carburizing bath, such as molten cyanide salt, to carburize the surface of the lever and thereafter quenching the lever by immersing the same in an oil bath. Surface-hardening of the lever by this procedure is desirable to augment the inherent resiliency of the metal of the lever by causing the spaced portions 30 and 31 of the slotted lever end to be provided with increased spring action to obtain gripping of the screw with greater pressure by the lever portions 30 and 31 for preventing unwanted rotation of the screw relative to the lever.

In tests conducted with an assembly of a screw and threaded locking lever formed and treated as described, it has been found that the screw can be rotated by manual effort to effect adjustment of the clutch control linkage, but the screw is otherwise so firmly gripped and held by the lever as to be incapable of being rotated by the control linkage during continuous and repeated movements thereof to actuate the release lever assembly for a period comparable to the normal life of the clutch.

From the foregoing disclosure, it will be apparent that I have provided a new and effective threaded locking device. While this invention has been described in detail as embodied in a clutch release lever assembly, it will be apparent to persons skilled in the art, after understanding the invention, that a threaded locking device constructed in the manner hereinbefore described may be utilized in a variety of different applications without departing from the spirit or scope of the invention. The invention is, therefore, to be limited only as indicated by the scope of the appended claims.

1. A threaded locking device comprising a sheet metal stamping including an elongated body portion having spaced laterally extending parallel edge flanges; a boss integral with said body portion disposed between said flanges and having an oval-shaped screw-threaded bore the major axis of which extends longitudinally of said body portion, said body portion having a slot therein extending from one end thereof between and substantially parallel with said flanges, through the edge of said boss and communicating with said bore, said slot being aligned with the major axis of said oval-shaped bore and the parts of said body portion at opposite sides of said bore and slot being surface-hardened and defining opposed spring regions for exerting pressure against the sides of a member in said bore.

2. A threaded locking device comprising a sheet metal stamping including an elongated body portion having spaced laterally extending parallel edge flanges; a boss integral with said body portion disposed between said flanges and having an oval-shaped screw-threaded bore the major axis of which extends longitudinally of said body portion, said body portion having a slot therein aligned with the major diameter of said oval-shaped bore and extending from one end of said body portion between and substantially parallel with said flanges, through the edge of said boss and communicating with said bore, the threads at opposite sides of said slot being in helical registration.

3. A threaded locking device comprising a stamped sheet metal strip including an elongated body portion, a boss integral with one end of said body portion and having an oval-shaped screw-threaded bore arranged with its major axis extending longitudinally of said body portion, said body portion having a slot therein extending inwardly from said one end of said body portion, through the edge of said boss and communicating with said bore, the parts of said end of said body portion, spaced by said slot and bore, being surface-hardened and defining spring regions for exerting pressure against the sides of a member in said bore.

4. A threaded locking device comprising a stamped sheet metal strip including an elongated body portion, a boss integral with one end of said portion and having an oval shaped screw-threaded bore the major axis of which extends longitudinally of the strip with the threads thereof in helical registration, said body portion having a slot therein extending from said one end of said body portion, through the edge of said boss and communicating with said bore, said slot being aligned with the major axis of said oval-shaped bore and defining diametrically opposed spring regions for exerting pressure against the sides of a member in said bore.

LESLIE F. MOHNS.

REFERENCES CITED

The following references are of record in the file of this patent:

UNITED STATES PATENTS

| Number | Name | Date |
|---|---|---|
| 1,113,419 | Dollman | Oct. 13, 1914 |
| 2,154,174 | Marchou | Apr. 11, 1939 |
| 2,299,209 | Brackett | Oct. 20, 1942 |
| 2,351,057 | Luce | June 13, 1944 |
| 2,388,467 | Cole | Nov. 6, 1945 |
| 2,457,697 | Lum | Dec. 28, 1948 |

FOREIGN PATENTS

| Number | Country | Date |
|---|---|---|
| 19,069 | Great Britain | Aug. 13, 1910 |